(12) United States Patent
Zank

(10) Patent No.: US 9,378,518 B2
(45) Date of Patent: *Jun. 28, 2016

(54) ELECTRONIC SIGNATURE SECURITY SYSTEM

(75) Inventor: Anthony E. Zank, Simi Valley, CA (US)

(73) Assignee: Topaz Systems, Inc., Simi Valley, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 13/050,603

(22) Filed: Mar. 17, 2011

(65) Prior Publication Data

US 2011/0167004 A1  Jul. 7, 2011

Related U.S. Application Data

(63) Continuation of application No. 11/813,023, filed as application No. PCT/US2005/047571 on Dec. 29, 2005, now Pat. No. 7,933,840, which is a continuation-in-part of application No. 11/027,525, filed on Dec. 30, 2004, now abandoned.

(51) Int. Cl.
*G06Q 20/00* (2012.01)
*G06Q 30/06* (2012.01)
*G06F 21/64* (2013.01)
(Continued)

(52) U.S. Cl.
CPC .............. *G06Q 30/06* (2013.01); *G06F 21/64* (2013.01); *G06Q 20/382* (2013.01); *G06Q 20/401* (2013.01)

(58) Field of Classification Search
CPC ................................. G06Q 20/3825
USPC ................. 705/74, 64, 75; 713/186; 380/280
See application file for complete search history.

(56) References Cited

U.S. PATENT DOCUMENTS

| 4,240,065 A | 12/1980 | Howbrook |
| 4,941,176 A | 7/1990 | Matyas et al. |
| 4,993,068 A | 2/1991 | Piosenka et al. |

(Continued)

FOREIGN PATENT DOCUMENTS

WO   2004032029   4/2004

OTHER PUBLICATIONS

Examination Report under Section 18(3), GB0712009.0, Dec. 16, 2008.

*Primary Examiner* — Charles C Agwumezie
(74) *Attorney, Agent, or Firm* — Jeffrey G. Sheldon; Leech Tishman Fuscaldo & Lampl

(57) ABSTRACT

One embodiment of the invention enhances the security of electronic signatures during transmission. A peripheral device, which may be located remotely and separate from a host processing system, captures the signature. The peripheral device then binds the signature to the particular transaction record and transmits it to the host processing system. The host processing system validates or confirms the received signature before accepting the transaction. Binding the signature and record data together at the point-of-use reduces the likelihood that someone may be able to hack into the transmission medium, encrypted or not, and obtain the raw signature data. By binding or associating the signature and transaction record data together at the point-of-use, each transaction has a unique key, further foiling attempts at hacking. In various implementations, rather than associating the whole signature with the transaction record data, signature sample points or segments are encrypted with transaction record data.

9 Claims, 11 Drawing Sheets

(51) Int. Cl.
*G06Q 20/38* (2012.01)
*G06Q 20/40* (2012.01)

(56) References Cited

U.S. PATENT DOCUMENTS

| | | | |
|---|---|---|---|
| 5,091,975 A * | 2/1992 | Berger | G06K 9/00154 235/379 |
| 5,111,512 A | 5/1992 | Fan et al. | |
| 5,195,133 A | 3/1993 | Kapp et al. | |
| 5,222,138 A | 6/1993 | Balabon | |
| 5,226,091 A | 7/1993 | Howell et al. | |
| 5,237,611 A | 8/1993 | Rasmussen et al. | |
| 5,251,265 A * | 10/1993 | Dohle | G07C 9/0015 382/123 |
| 5,278,905 A | 1/1994 | McNair | |
| 5,280,527 A | 1/1994 | Gullman et al. | |
| 5,285,506 A | 2/1994 | Crooks | |
| 5,297,202 A | 3/1994 | Kapp et al. | |
| 5,301,247 A | 4/1994 | Rasmussen et al. | |
| 5,544,255 A | 8/1996 | Smithies et al. | |
| 5,698,822 A | 12/1997 | Haneda et al. | |
| 5,799,086 A | 8/1998 | Sudia | |
| 5,850,451 A | 12/1998 | Sudia | |
| 5,872,848 A | 2/1999 | Romney | |
| 5,892,824 A | 4/1999 | Beatson et al. | |
| 5,909,500 A | 6/1999 | Moore | |
| 5,910,988 A | 6/1999 | Ballard | |
| 5,925,865 A | 7/1999 | Steger | |
| 5,936,149 A | 8/1999 | Fischer | |
| 5,956,404 A | 9/1999 | Schneier et al. | |
| 5,995,084 A | 11/1999 | Chan et al. | |
| 6,021,202 A | 2/2000 | Anderson et al. | |
| 6,032,137 A | 2/2000 | Ballard | |
| 6,058,476 A | 5/2000 | Matsuzaki et al. | |
| 6,064,751 A | 5/2000 | Smithies et al. | |
| 6,088,802 A | 7/2000 | Bialick et al. | |
| 6,202,151 B1 * | 3/2001 | Musgrave et al. | 713/186 |
| 6,234,389 B1 | 5/2001 | Valliani et al. | |
| 6,307,995 B1 | 10/2001 | Veligdan | |
| 6,311,272 B1 * | 10/2001 | Gressel | 713/186 |
| 6,363,363 B1 | 3/2002 | Haller et al. | |
| 6,539,363 B1 | 3/2003 | Allgeier et al. | |
| 6,583,813 B1 | 6/2003 | Enright et al. | |
| 6,738,749 B1 | 5/2004 | Chasko | |
| 6,745,327 B1 | 6/2004 | Messing | |
| 6,959,394 B1 | 10/2005 | Brickell | |
| 7,039,805 B1 | 5/2006 | Messing | |
| 7,107,454 B2 | 9/2006 | Mori et al. | |
| 7,120,607 B2 * | 10/2006 | Bolle et al. | 705/64 |
| 7,124,170 B1 * | 10/2006 | Sibert | 709/216 |
| 7,146,577 B2 | 12/2006 | Hoffman | |
| 7,162,434 B1 | 1/2007 | Walker et al. | |
| 7,200,752 B2 | 4/2007 | Eskicioglu | |
| 7,292,999 B2 | 11/2007 | Hobson | |
| 7,391,865 B2 * | 6/2008 | Orsini et al. | 380/201 |
| 7,933,840 B2 * | 4/2011 | Zank | G06F 21/64 380/280 |
| 2002/0048364 A1 | 4/2002 | Gligor et al. | |
| 2002/0140714 A1 | 10/2002 | Hoffman | |
| 2002/0174075 A1 | 11/2002 | Mirlas et al. | |
| 2003/0048173 A1 * | 3/2003 | Shigematsu et al. | 340/5.52 |
| 2003/0065922 A1 * | 4/2003 | Fredlund | H04L 63/0823 713/176 |
| 2003/0105725 A1 * | 6/2003 | Hoffman | 705/75 |
| 2003/0110382 A1 | 6/2003 | Leporini et al. | |
| 2003/0126303 A1 * | 7/2003 | Kadakia | H04L 63/0442 719/313 |
| 2003/0172280 A1 | 9/2003 | Scheidt et al. | 713/182 |
| 2003/0225693 A1 | 12/2003 | Ballard | |
| 2004/0010697 A1 * | 1/2004 | White | 713/186 |
| 2004/0059924 A1 | 3/2004 | Soto | |
| 2004/0083177 A1 | 4/2004 | Chen et al. | |
| 2004/0156537 A1 | 8/2004 | Chung | |
| 2004/0193538 A1 | 9/2004 | Raines | |
| 2004/0208316 A1 * | 10/2004 | Wack et al. | 380/44 |
| 2005/0102244 A1 * | 5/2005 | Dickinson et al. | 705/74 |
| 2005/0144136 A1 * | 6/2005 | Murashita | 705/51 |
| 2005/0172137 A1 | 8/2005 | Hopkins | |
| 2006/0106606 A1 | 5/2006 | Labaton | |
| 2007/0038867 A1 * | 2/2007 | Verbauwhede et al. | 713/186 |

* cited by examiner

ELECTRONIC SIGNATURE SECURITY SYSTEM

CROSS-REFERENCE TO RELATED APPLICATIONS

This application is a Continuation of U.S. patent application Ser. No. 11/813,023 filed on Sep. 7, 2007 titled "Electronic Signature Security System" which claims priority from International Patent Application PCT/US2005/047571, titled "Electronic Signature Security System," filed Dec. 29, 2005, which claims priority from and is a Continuation-in-Part of U.S. patent application Ser. No. 11/027,525, titled "Electronic Signature Capture Security System," filed Dec. 30, 2004, the contents of which are incorporated by reference herein in their entirety.

FIELD OF THE INVENTION

Various embodiments of the invention pertain to securing electronic signatures. At least one embodiment of the invention pertains to a system and method for capturing and securing electronic signatures by a hashing algorithm.

BACKGROUND

In recent years, an increasing number of transactions are being conducted over electronic mediums. Law, regulations, and industry standards have been adopted to facilitate the use of electronic records and signatures in interstate and foreign commerce. Some of these laws and regulations specify that an acceptable technology for electronic signatures must be linked to data in such a manner that if the data is changed, the digital signature is invalidated.

Many of these techniques involve peripheral devices communicatively coupled to a computer or network that can be used by the signer to authenticate a transaction. These peripheral devices are deployed in a variety of environments, from devices that are carried around to homes and businesses by individual insurance agents to counter-top retail and banking applications, to individual desktop applications, to portable applications with memory and wireless devices.

Keeping in mind the technology guidelines above, there are several technologies that appear to be capable of meeting the requirements. Generally, they fall into the categories of something you are, something you do, something you know, or something you have. Typical examples of acceptable electronic signatures include: handwritten signatures, fingerprints, iris scans, voice recording, personal identification number (PIN), hand geometry, public key infrastructure (PKI) certificates, smart cards, identification card, credit or debit card.

In considering data security and data transmission security, several techniques exist, and indeed have become commonplace to secure and encrypt data transferred between computers, networks and peripheral devices used in commerce today.

Now that peripheral devices are being used to sign contracts and capture electronic signatures, an opportunity exists to improve their effectiveness and security. This opportunity exists in both the closed systems of the past and in less structured open systems associated with individuals and small businesses.

While the prior art has attempted to provide secure transactions schemes, these schemes have various shortcomings. For example, Kapp et al., U.S. Pat. No. 5,297,202, describes a two-part encryption scheme for protecting electronic signatures. A transaction code is created and displayed as part of the transaction record. This transaction code is made-up of a first word identifying a particular merchandising location and perhaps a time identifier, and a second word that is sequentially assigned. In the first step, the transaction code is used to encrypt the signature data and provide an encrypted signature file. In the second step, secure encryption keys, known at both ends of the transaction, are then used to encrypt the resulting encrypted signature file. There are several weaknesses with this approach. First, the transaction record used to encrypt the signature is displayed with the transaction data, thereby making it susceptible to unauthorized access. Second, the transaction code is partially based on a location identifier and a sequentially assigned number, making it easier to break the transaction code by having access to previous transactions.

SUMMARY OF THE INVENTION

One embodiment of the invention provides a system, method, and device to enhance the security and compliance of electronic signatures with existing regulations and good practice. In one implementation, an electronic signature is captured on a peripheral device that is not contained in the main processor and may be located remotely from the processor by a few feet or thousands of miles. The system binds signature and record data together at the point-of-use to reduce the likelihood that someone may be able to hack into the transmission medium, encrypted or not, and obtain the raw signature data. By binding or associating the signature and record data together at the point-of-use, each record has a unique key, further foiling attempts at hacking. Through the use of a shared secret that is not transmitted, or never transmitted over the transmission medium, but which is related to a programmed value such as a serial number or a serial number that is modified by a real-time computed (RTC) value, or which can be reset by a command without exchanging data, security is further enhanced.

By linking the signature and record data at the point-of-use, in conjunction with the use of the record data and associated hash, all types of electronic signature systems can implement regulatory requirements more securely, as attempts to defeat less-secure systems intensifies. By saving cryptographic representations of signature and/or record data in the peripheral device, the integrity of the overall transaction can be further enhanced and verified.

This system is compatible with, but is not dependent upon standard encryption techniques commonly in use to protect the transmission of digital data.

One embodiment of the invention provides a method comprising the steps of: (a) receiving transaction data at a first device; (b) capturing a signature at the first device; (c) encrypting the captured signature with the transaction data at the first device; and (d) transmitting the transaction data and encrypted signature from the first device to a second device.

This method of can also include the step of encrypting the captured signature with a hash of the transaction data. The transaction data may include price information for the transaction and/or identification of the goods being transacted, among other information. The method can also include receiving a hash of the transaction data at the first device and/or generating a hash of the transaction data at the first device. The method may additionally include the steps of: (a) generating a local hash of the transaction data at the second device using the same algorithm used to generate the hash at the first device; (b) decoding the encrypted captured signature at the second device using the local hash of the transaction data; and (c) comparing the captured signature to a stored signature for verification.

One aspect of the invention provides for capturing a digital signature and/or biometric signature on a point-by-point (or segment-by-segment) basis and separately encrypting said points to the record data. The separately encrypted signature sample points or segments may be stored separately, at transmitting and/or receiving devices, so that the complete signature does not appear on the same processor or memory at any one time. This prevents rogue programs from capturing or determining the signature by snooping on a processor or memory.

Another aspect of the invention further provides for: (a) combining the transaction data with a secret key generated at the first device; (b) generating a hash of the combined transaction data and secret key to create a derivative record key at the first device; and (c) encrypting the captured signature by using the derivative record key as a seed to an encryption algorithm in the first device.

Yet another feature of the invention provides for sporadically (or at irregular intervals) sending the secret key between the first device to the second device.

Another embodiment of the invention also includes: (a) generating a hash of the combined transaction data and secret key to create a derivative record key at the second device; and (b) decoding the encrypted captured signature at the second device using the derivative record key. If the decoding of the encrypted captured signature at the second device fails, the second device searches for the correct derivative record key by modifying the secret key. The encrypted signature may also be transmitted from the first device to the second device in a plurality of data fragments and this plurality of data fragments are sent in a pseudo-random order.

Yet another feature of the invention provides for: (a) dividing the signature data into a plurality of fragments, (b) separately encrypting each of the plurality of fragments with the transaction data, (c) transmitting the plurality of fragments from the first device to the second device, (d) keeping a first count of the plurality of fragments transmitted from the first device, (e) transmitting the first count to the second device, (f) keeping a second count of the plurality of fragments received by the second device, and (g) comparing the first count to the second count to determine if all signature fragments have been received.

According to one embodiment of the invention, the signature security method provides for: (a) generating a first derivative record key by taking a hash of the combination of a first clock value with the transaction data, wherein the first clock value is found in the first device; (b) utilizing the first derivative record key to encrypt the captured signature at the first device; (c) generating a second derivative record key by taking a hash of the combination of a second clock value, an offset value, and the transaction data at the second device, wherein the second clock value is found at the second device; and (d) decrypting the encrypted signature with the second derivative record key at the second device.

The invention also provides for a transaction system including a signature-capturing device configured to (a) capture an electronic signature, (b) generate a hash of a transaction record, (c) encrypt the electronic signature with the hash of the transaction record, (d) transmit the encrypted electronic signature, and (e) a host processing device communicatively coupled to the signature-capturing device, the host processing device configured to (1) receive the encrypted electronic signature, (2) decrypt the electronic signature, (3) compare the electronic signature to a reference signature, and (4) accept a transaction corresponding to the electronic transaction record if the received electronic signature matches the reference signature. The signature-capturing device may also be configured to initiate the transaction record, and transmit the transaction record to the host processing device. The host processing device may also be configured to generate a hash of the transaction record to use in decrypting the electronic signature.

According to one embodiment of the invention, the signature-capturing device is further configured to (a) transmit the encrypted electronic signature as a plurality of data packets, (b) maintain a count of the number of data packets transmitted for a particular signature, (c) securely transmit the count of the data packets to the host processing device; and (d) the host processing device is further configured to compare the count of data packets transmitted by the signature-capturing device to the number of data packets it receives associated with the particular signature to determine if the signature was completely received.

According to another embodiment of the invention, the signature-capturing device is further configured to (a) arrange the encrypted electronic signature as a plurality of data packets, (b) transmit the plurality of data packets in a pseudo-random order; and (c) the host processing device is further configured to (1) receive the plurality of data packets in pseudo-random order, and (2) reconstruct the original order of the plurality of data packets.

Yet another embodiment of the invention provides an authentication device comprising: (a) a signature-capturing device configured to capture a signature information; and (b) a controller communicatively coupled to the signature-capturing device, the controller configured to (1) receive transaction data, (2) generate a hash of the transaction data, (3) encrypt the captured signature information with the hash of the transaction data, and (4) transmit the encrypted signature information. Such authentication device may further comprise: (a) an output device to present the transaction data to a user; and (b) an input device to permit a user to modify the transaction data. The authentication device may also perform the tasks of: (a) combining the transaction record with a secret key, (b) generating a hash of the combined transaction data and secret key to create a derivative record key, (c) encrypting the captured signature with the derivative record key as a seed to an encryption algorithm, (d) dividing the captured signature information into a plurality of packets, (e) separately encrypting each of the plurality of packets with the transaction data, and (d) wherein transmitting the encrypted signature information includes transmitting the plurality of packets out of sequence in a pseudo-random order.

In yet another embodiment of the invention, a machine-readable medium provides one or more instructions for processing an electronic signature at a peripheral device, which when executed by a processor, causes the processor to perform operations comprising: (a) receiving a transaction data; (b) capturing a signature from a user; (c) generating a hash of the transaction data; (d) encrypting the captured signature with the hash of the transaction data; and (e) transmitting the encrypted signature. Encrypting the captured signature using the transaction data may include (a) combining the transaction data with a secret key, (b) generating a hash of the combined transaction data and secret key to create a derivative record key, and (c) encrypting the captured signature by using the derivative record key as a seed to an encryption algorithm.

The machine-readable medium instructions may further perform operations for (a) dividing the captured signature into a plurality of data fragments; (b) separately encrypting the plurality of data fragments; and (c) transmitting the plurality of data fragments in a pseudo-random order.

One implementation of the invention provides a standalone transaction-authenticating device comprising: (a) a signature-capturing device configured to capture an electronic signature information; (b) a controller communicatively coupled to the signature-capturing device, the controller configured to (1) receive a transaction data including price information, (2) generate a hash of the transaction data, (3) divide the captured signature information into a plurality of packets, (4) separately encrypt each of the plurality of packets with a hash of the transaction data, and (5) transmit the plurality of packets out of sequence in a pseudo-random order; (c) an output device communicatively coupled to the controller, the output device to present the transaction data; and (d) an input device communicatively coupled to the controller, the input device to permit modifying the transaction data. The controller may further be configured to (a) combine the transaction data with a secret key; (b) generate a hash of the combined transaction data and secret key to create a derivative record key; and (c) separately encrypt each of the plurality of packets with the derivative record key as a seed to an encryption algorithm. The signature-capturing device may be a tablet, keypad, iris recognition device, fingerprint recognition device, or voice recognition device, or other suitable electronic signature device.

DETAILED DESCRIPTION

Figure 1:
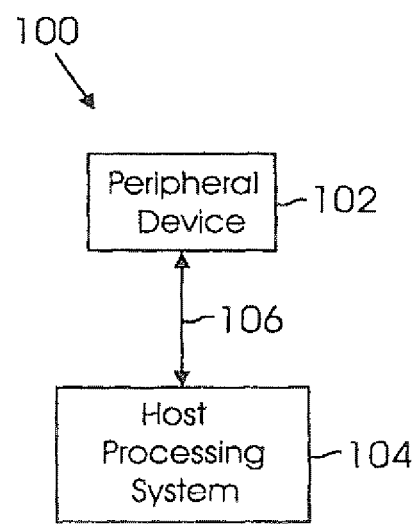
FIG. 1 is a block diagram illustrating a system for providing electronic signature security according to one embodiment of the invention.

In the following description numerous specific details are set forth in order to provide a thorough understanding of the invention. However, one skilled in the art would recognize that the invention might be practiced without these specific details. In other instances, well known methods, procedures, and/or components have not been described in detail so as not to unnecessarily obscure aspects of the invention.

In the following description, certain terminology is used to describe certain features of one or more embodiments of the invention. For instance, the term "electronic" means relating to technology having electrical, digital, magnetic, wireless, optical, electromagnetic, or similar capabilities. The term "electronic record" means a contract or other record created, generated, sent, communicated, received, or stored by electronic means. The term "electronic signature" means an electronic sound, symbol, process, or other information, attached to or logically associated with a contract or other record and executed or adopted by a person with the intent to sign or authenticate the record. The term "information" means data, text, images, sounds, codes, computer programs, software, databases, or the like. The term "record" means information that is inscribed on a tangible medium or that is stored in an electronic or other medium and is retrievable in perceivable form. The term "transaction" means an action or set of actions relating to the conduct of business, consumer, or commercial affairs between two or more persons, including, but not limited to, (A) the sale, lease, exchange, licensing, or other disposition of (i) personal property, including goods and intangibles, (ii) services, and (iii) any combination thereof; and (B) the sale, lease, exchange, or other disposition of any interest in real property, or any combination thereof. The term "encoded" refers to converting data into a given format and can include encryption of data. The term "certification" refers to validating the authenticity of something or someone. In this case "certification" includes authentication of the electronic signature device and its timing interval, spatial resolution and/or other associated measures appropriate for the authentication of an electronic signature, etc. The term "stamp" refers to affixing a stamp to, as in adding a time and date or model and serial number stamp to data. The term "pseudo-random" refers to having the appearance of being random, but not random to one having the knowledge of how the randomness is created. The term "controller" refers to any device that can serve to process signals, including any number of data processing means, from a simple 8-bit microcontroller chips up to and including powerful processors including RAM, ROM, Flash, disk drives, hardware encryption and accelerators, math co-processors.

One embodiment of the invention provides a system, method, and device to enhance the security and compliance of electronic signatures with existing regulations and good practice. The invention provides security to a signature that is captured at a peripheral device and sent to a host processing system, where the signature is validated or confirmed for purposes of executing a transaction. In one implementation of the invention, an electronic signature is captured at a peripheral device that is separate from, and not contained in, the host processing unit. The peripheral device may be located remotely from the host processing system by a few feet or thousands of miles. The peripheral device is configured to bind the signature and record data together at the point-of-use (e.g., the peripheral device) to reduce the likelihood that someone may be able to hack into the transmission medium, encrypted or not, and obtain the raw signature data. By binding or associating the signature and record data together at the point-of-use, each record has a unique key, further foiling attempts at hacking. One aspect of the invention provides for capturing a digital signature on a point-by-point basis and binding or associating the digital signature point, segment, etc., to the record data.

A second feature of the invention uses shared secret information between the peripheral device and host processing system to further secure the data transmissions. The secret information is data that is not transmitted, or never transmitted over the transmission medium, but which is related to a programmed value, such as a serial number or a serial number that may be modified by a real-time clock (RTC) value, or which can be reset by a command without exchanging data. The secret information may also be provided by some alternate means such as a hardware smartcard, alternate transmission method, encrypted data interface, or alternative transmission medium which is not the same as the primary data interface (i.e., signature-capturing interface) used by the peripheral device to sign or authenticate commercial transactions.

FIG. 1 is a block diagram illustrating a system 100 for providing electronic signature security according to one embodiment of the invention. A signature-capturing device 102 is located at the point-of-use where a party can accept a transaction by electronically signing a transaction record. The transaction record may originate with either the signature-capturing device 102 or with a host processing system 104. The signature-capturing device 102 is communicatively coupled to the host processing system 104 via a transmission medium 106. The signature-capturing device 102 may be any device, either stand-alone or part of another device, capable of capturing a user's electronic signature or any other transaction-authenticating information. An "electronic signature" or "signature", as used herein, include but are not limited to, electronic sound(s), symbol(s), process(es), digitized personal signatures, PIN numbers or codes, thumbprints, palm scans, iris scans, and any other information that can attached to or logically associated with a contract or other record and executed or adopted by a person with the intent to sign the record.

The host processing system 104 is any processor, computer, device, and/or network or combination of devices that validate or confirm the electronic signature and/or process the transaction record.

According to one embodiment of the invention, an electronic signature is captured by the signature-capturing device 102 which may be located remotely from the host processing unit 104 by a few feet or thousands of miles. The signature-capturing device 102 is configured to bind the captured signature and transaction record data together at the point-of-use to reduce the likelihood that someone may be able to hack into the transmission medium 106, encrypted or not, and obtain the raw signature data. The transmission medium 106 may be a secure communication path or network (e.g., a dedicated line or private data network), an unsecured communication path or network (e.g., telephone line, public network, the internet, radio transmissions, etc.) and/or include other communication devices along the transmission medium 106. Because a transmission medium may not be secure, in some instances, it is very important that the electronic signature be protected prior to transmission over such medium. That is, an unsecured transmission medium exposes all transmissions, including the electronic signature, to unauthorized snooping or access. The transaction record data or transaction record may include the name of one or more parties to the transaction, addresses, list of goods or services being transacted, cost of the goods or services, number or units being transacted, transaction date and time, delivery date and time, and any other information or statements that may be appropriate to include in the transaction record prior to signing.

In one embodiment of the invention, the captured signature is secured prior to transmission from the signature-capturing device 102 by doing a hash of the transaction record data and then using the result of the hash as an encryption key to encrypt the captured signature. In another embodiment of the invention additional security may be provided by taking the result of the transaction record data hash, combining it with one or more secret keys (e.g., real-time clock, peripheral device serial number, internal counter, or other secure number or symbol), taking a hash of that combination, and using the resulting derivative hash as a key to encrypt the captured signature before it is transmitted from the signature-capturing device. Note that the same or a different hash algorithm may be used in generating the transaction record data hash and the derivative hash without departing from the invention.

Figure 2:
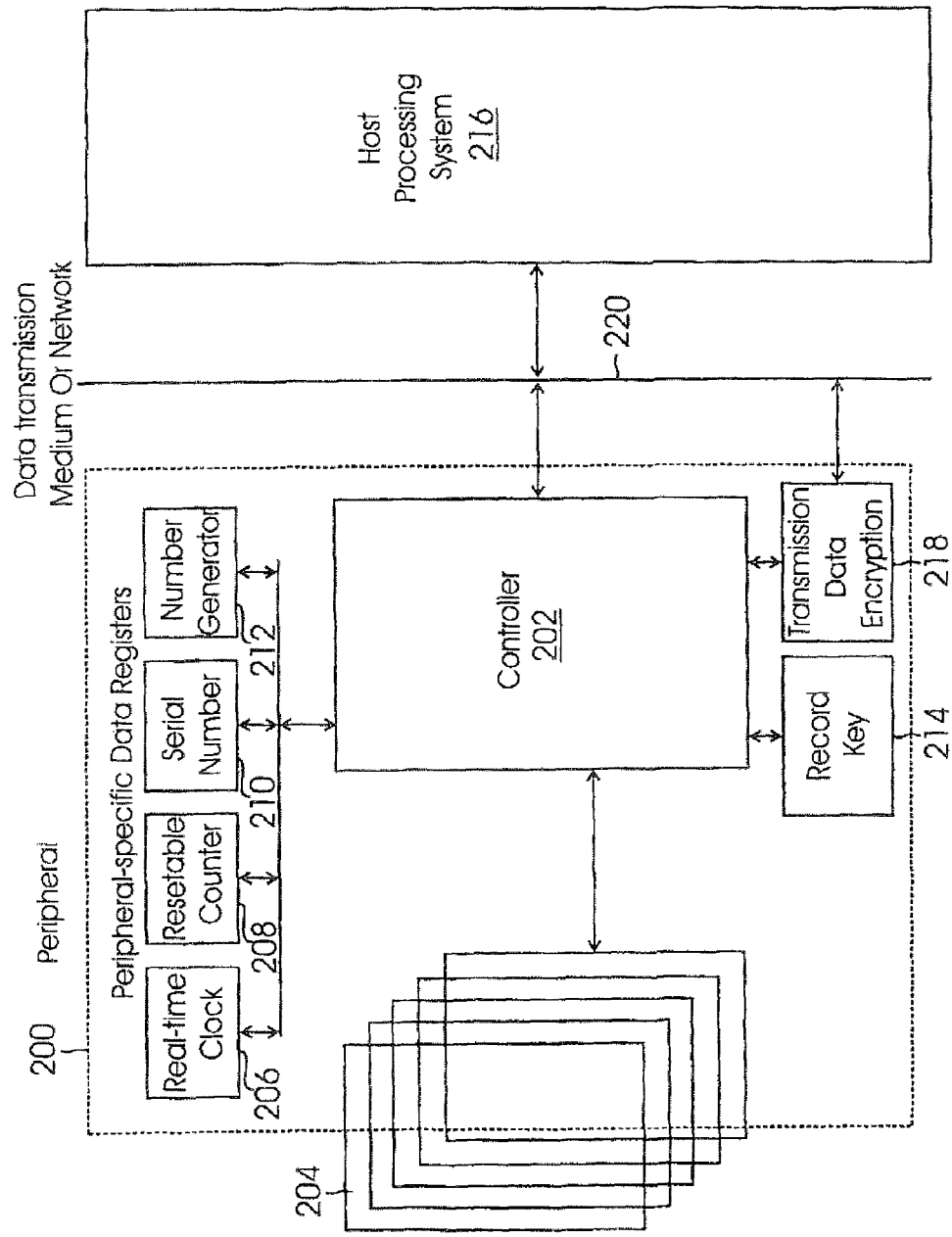
FIG. 2 is a block diagram illustrating a peripheral device for securing electronic signatures in transactions according to one embodiment of the invention.

FIG. 2 is a block diagram illustrating a peripheral device 200, such as the signature-capturing device 102 described in FIG. 1, for securing electronic signatures in transactions according to one embodiment of the invention. The peripheral device 200 may include a controller 202 with storage capacity (e.g., RAM, ROM, EPROM, etc.). The controller 202 is communicatively coupled to one or more types of electronic signature-capturing interfaces 204 where a user or party to a transaction can provide an electronic signature to accept, validate and/or authenticate the transaction. The electronic signature-capturing interfaces may include one or several signature interfaces, such as a pen/tablet interface, a fingerprint recognition interface, a PIN keypad, a voice recognition interface, or other authenticating interfaces. Preferably, the signature-capturing interfaces 204 have their own clock circuits and values that are used to sample the signature data at regular, periodic, and certified intervals. Once a user provides a signature or other authenticating information at the electronic signature-capturing interface 204, this information is sent to the controller 202 for encryption.

One aspect of the invention provides for capturing a digital signature and/or biometric signature on a point-by-point basis and separately encrypting said points to the record data. That is, the digital signature or biometric signature may be captured or represented as points or segments, including displacement coordinates (e.g., x, y, z points), sound time segments or samples, pressure exerted in entering particular points or segments of the digital signature, and/or a timing index or increment of the point (e.g., relative time of a captured point or segment, time between captured points/segments, time length of a captured point or segment, etc.). The separately encrypted signature sample points or segments may be stored separately, at the transmitting and/or receiving devices, so that the complete signature does not appear on the same processor or memory at any one time. This prevents rogue programs from capturing or determining the signature by snooping on a processor or memory.

One aspect of the invention seeks to protect the captured signature before it leaves the peripheral device 200. According to one embodiment of the invention, the controller 202 is configured to initiate or receive a transaction record. Such transaction record contains information related to that particular transaction (e.g., terms of the transaction, parties to the transactions, addresses of the parties, relevant dates, goods or services involved in the transaction, specification of goods or services involved in the transaction, etc.). The controller 202 performs a hash operation of the transaction record. The result of the hash operation of transaction record data is a unique record-dependent key, referred to as the Record Key. Such hash operation converts an input from a typically large domain into an output in a smaller range. According to another embodiment of the invention, the Record Key is generated outside of the peripheral device 200 and then sent to the controller 202. Either way, the resulting Record Key is then used by the controller 202 to encrypt the signature or authentication information within the peripheral device 200 prior to transmission to the host processing unit 216. For instance, the Record Key may serve as a seed for an encryption algorithm to encrypt the signature. An encryption unit 218 may also provide additional encryption, if desired or specified, prior to transmission over a data transmission medium 220.

In embodiments where a digital signature is captured on a point-by-point basis, the points or segments captured may be separately encrypted. That is, rather than capturing the whole signature and then encrypting it, one aspect of the invention encrypts points or segments of the electronic signature using the Record Key, a hash, or any of the encryption described herein. Separately encrypting the points or segments of a digital signature or biometric signature improves security during transmission.

The host processing unit 216 is where the signature is confirmed or authenticated and/or where the transaction record is processed, validated, and/or stored. According to various embodiments of the invention, the host processing unit 216 can either create a transaction record or receive a transaction record from the peripheral device 200 or another device.

One embodiment of the invention provides one or more data registers that may be used to hold such information as a real-time clock 206, a resettable counter 208, a peripheral device serial number 210, or a number generator 212 (e.g., pseudo-number generator). These data registers are communicatively coupled to the controller 202 so that one or more of the values therein can be used by the controller 202 in encrypting the signature or authenticating information from the signature-capturing interface 204. For example, according to one embodiment of the invention, signature security may be provided by doing a hash of the transaction record, taking the result of the transaction record hash and combining it with one or more secret keys (e.g., real-time clock, peripheral device serial number, internal counter, pseudo-random number, or other secure number or symbol), taking a hash of that combination, and using the resulting derivative hash as a key to encrypt the captured signature before it is transmitted from the peripheral device 200. These "secret keys" do not constitute a "message", but are data used to improve the security and integrity of the process.

According to some embodiments of the invention, the peripheral device 200 may also include an output device (e.g., display screen, printer, etc.) on which the transaction record can be presented to the user or party to the transaction. This output device may be integral with the peripheral device 200 or be separate from the peripheral device 200. Additionally, an input device may be provided, either integral with or separate from the peripheral device, where the user or party to the transaction can modify the transaction record (e.g., enter personal information, order information, account information, etc.).

Figure 3:
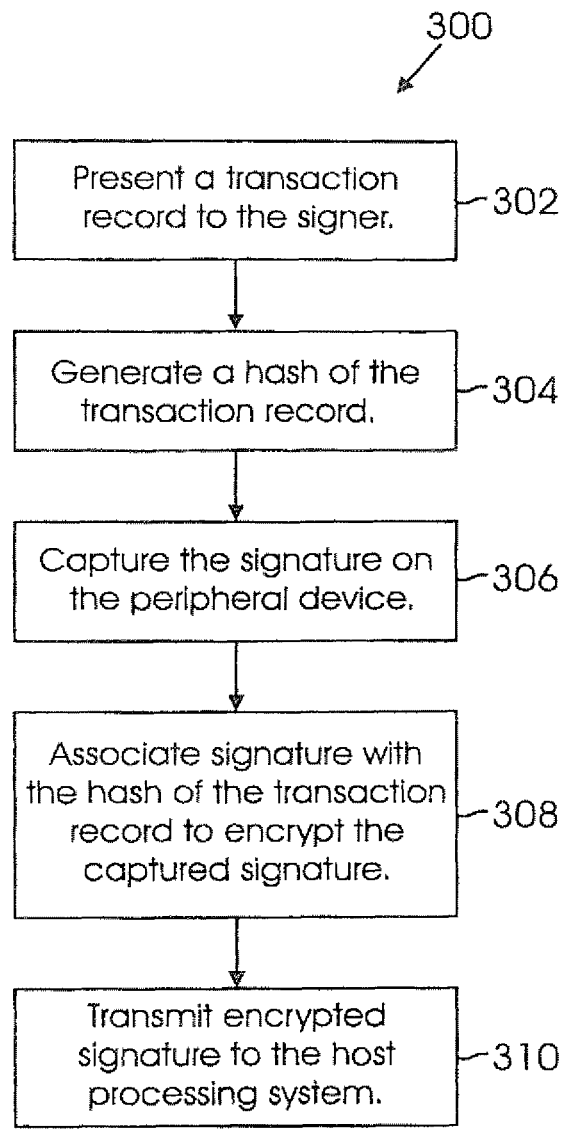
FIG. 3 is a flow diagram illustrating a method of providing a secure transaction between a peripheral device and host processing system according to one embodiment of the invention.

FIG. 3 is a flow diagram illustrating a method 300 of providing a secure transaction between a peripheral device and host processing system according to one embodiment of the invention. A transaction record is presented to the signer 302. This can be done is several ways, such as printing it on paper, displaying its contents on a peripheral device (e.g., point-of-sale station, screen, etc.), displaying it on a separate display device near the signer, or by any other suitable output device or means. Generating a final transaction record may involve some interaction and input of information by the user or party to the transaction, like name(s), address(es), dollar amount(s) and other information or statements that may be appropriate to include in the transaction record prior to signing.

Note that that the transaction record may be generated anywhere, including at a host processing system (e.g., computer or other device separate from a signature-capturing peripheral device), at a signature-capturing peripheral device if the full record has been sent to the peripheral device, or both. For example, a transaction record may be initiated at a host processing system away from the peripheral device and then presented to the user or party who may modify the transaction record by entering additional information.

A hash of the transaction record is generated 304. This hash operation on the transaction record can be done at the host processing system (e.g., computer or other device separate from the signature-capturing peripheral device), the signature-capturing peripheral device if the full record has been sent to the peripheral device, or both. If the hash is created only at the host processing system, it is then sent to the peripheral device via the appropriate interface.

The peripheral device then captures the signature 306 and associates the signature with the hash of the transaction record, or some derivative of the hash of the transaction record 308. According to one embodiment of the invention, this "association" of the signature and hash of the transaction record means that the hash of the transaction record is used as a seed or key for an encryption algorithm that encrypts the captured signature.

Instead of using just the hash of the transaction record to secure the captured signature, one embodiment of the invention uses a derivative hash for this purpose. A derivative of the hash of transaction record may simply be a second hash, a checksum or other mathematical operation, or a second hash or operation that includes other data in addition to the transaction record. This additional data may be present within the peripheral device, like time and date, or clock counter data or data which is input at the time of signature capture that is not sent by the computer as a part of the transaction-at-hand, or can be a serial number or other encoded data related to the peripheral device. The derivative hash can also be generated by mixing the hash data with a secret key that may be used to protect data transmission. Alternatively, the derivative hash can be based on an equation or key that is loaded into the peripheral device and known only to the peripheral device and the processor. In any case, no matter what the final form of the data derived from the transaction record hash, it is hereinafter referred to as Record Key.

The signature is then transmitted to the host processing system in a form where it is encrypted 310, either in whole or in part, with the Record Key, or is otherwise sent in a manner so that it is associated with the Record Key. Note that this encryption or association is in addition to whatever form or common encryption that may be used as a part of a standard data transmission security protocol. In one embodiment, different sample points or segments of an electronic signature or biometric signature may be encrypted with a different Record Key or a different hash based on the same or different Record Key. For example, a different encryption key may be generated in a pseudorandom or other manner and used to encrypt the different signature points or samples.

Figure 4:
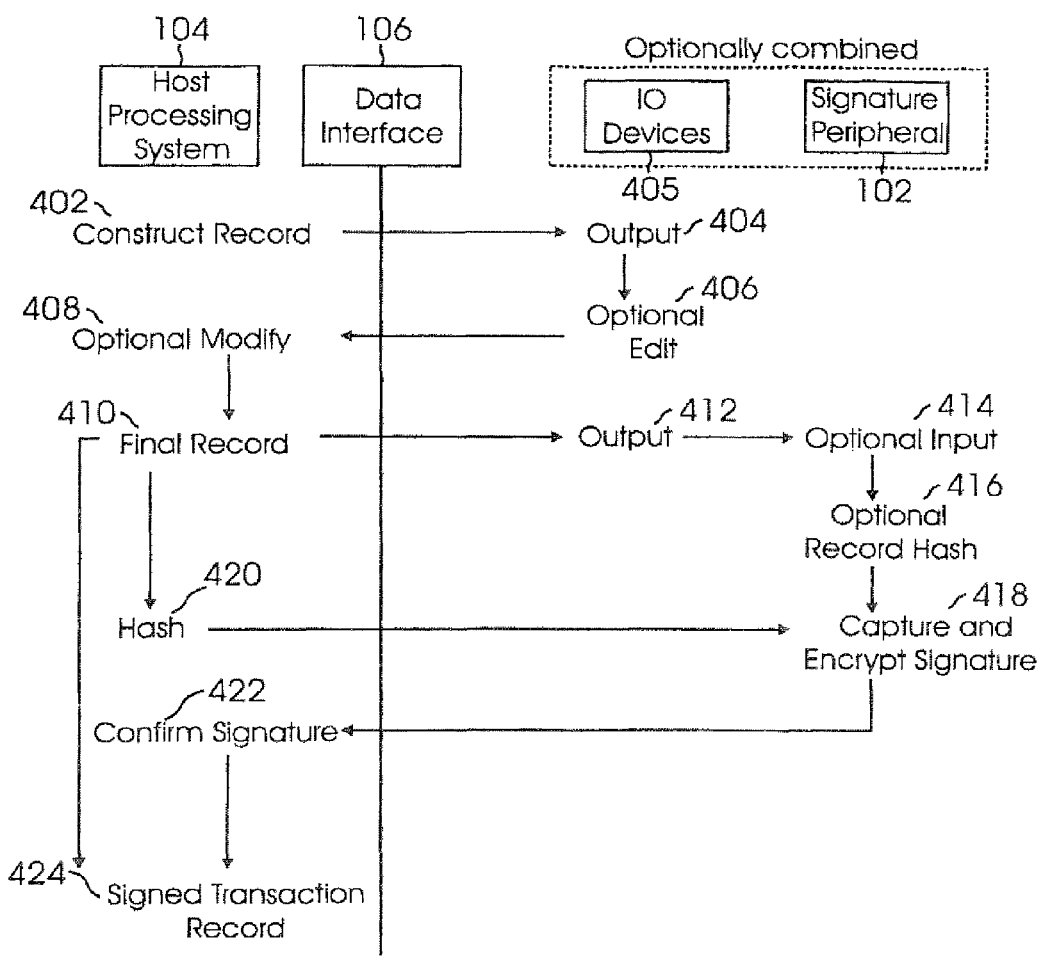
FIG. 4 is a flow diagram illustrating an electronic signature encryption method based on transaction record hashing according to one embodiment of the invention.

FIG. 4 is a flow diagram illustrating an electronic signature encryption method based on transaction record hashing according to one embodiment of the invention. A transaction record is constructed 402 by the host processing system 104. The transaction record may be sent 404 to an input/output (I/O) device 405 (e.g., tablet, display, touch screen, keypad, printer, audio speaker and microphone, Braille device, etc.) for presentation to the user and, possibly, editing 406, such as adding customer information, etc. The transaction record may also be modified 408 at the host processing system 104 to create a final record 410. The final record may be processed in different ways from this point forward.

According to one embodiment of the invention, the transaction record may be sent 412 to the input/output device 405 for optional editing 414. The signature peripheral device 102 may generate a hash of the transaction record that results in a Record Key 416. In some implementations, as when various signature points or segments are separately encrypted, a different hash based on the transaction record or a pseudorandom value to obtain one or more Record Keys with which to encrypt the different signature samples or segments.

According to another embodiment of the invention, the host processing system 104 may generate a hash 420 of the transaction record 410 to create the Record Key. The Record Key is then sent to the signature peripheral device 102.

The signature peripheral device 102 then requests that the user or party sign or authenticate the transaction by entering an electronic signature 418 in the signature peripheral device 104. In other embodiments of the invention a different authentication device may be used instead of the signature peripheral device 102 to collect other authenticating information from the user or party to the transaction. The signature peripheral device 102 captures the user's signature and encrypts it 418. In one embodiment of the invention, the signature peripheral device 104 may encrypt the customer's signature using the Record Key as the seed or key to an encryption algorithm.

The encrypted signature is then sent from the signature peripheral device 102 to the processor 104 for confirmation 422. Such signature confirmation 422 involves decrypting the encrypted signature and comparing the user's electronic signature entered at the signature peripheral device 102 to a previously entered electronic signature. To decrypt the encrypted signature the host processing system 104 must have the Record Key, which it may generate from the transaction record. If the electronic signatures match, then the transaction record is considered properly signed 424. The final record 410 together with the electronic signature are then stored or processed 424. Note that where various points or segments of the signature are encrypted separately, and then separately transmitted, these separate points or segments can be separately decrypted and verified.

Another feature of the invention provides that the signature peripheral device 102 can be further programmed to generate a hash of the user's signature, either in whole or in part, and store either the hash, the Record Key, the signature hash, or any combination of all three within its internal memory or are transmitted to the host or to alternative storage locations, hosts, via any available means for later use in comparison should the user's signature and/or transaction record data come into question.

By this method of (1) hashing the transaction record by sending the record data to the peripheral device, or hashing the data in the host processing system and then sending to the peripheral device, and (2) the peripheral device encrypting or otherwise associating the signature with the hash or a derivative of the hash, a secure electronic signature is created that is more-fully compliant with recently enacted laws applicable at the point-of-use. Note that this same method may be implemented on separate points or segments of a signature rather than the whole signature.

With the scheme described in FIG. 4, the chances are reduced that a rogue program operating on the processor will be able to "steal" a signature if the encryption of that signature is tied to a transaction-specific hash or Record Key that essentially changes with every transaction naturally because the resulting key is based on the transaction record. This synergy essentially solves two problems at the same time—encryption key security, and signature/record binding.

The use of a derivative hash provides additional benefits to the integrity of the system, either with, or without data encryption. For example, a bank may implement such derivative hashing to prevent any attempt to intercept signatures on the network for potential fraudulent use.

Figure 5:
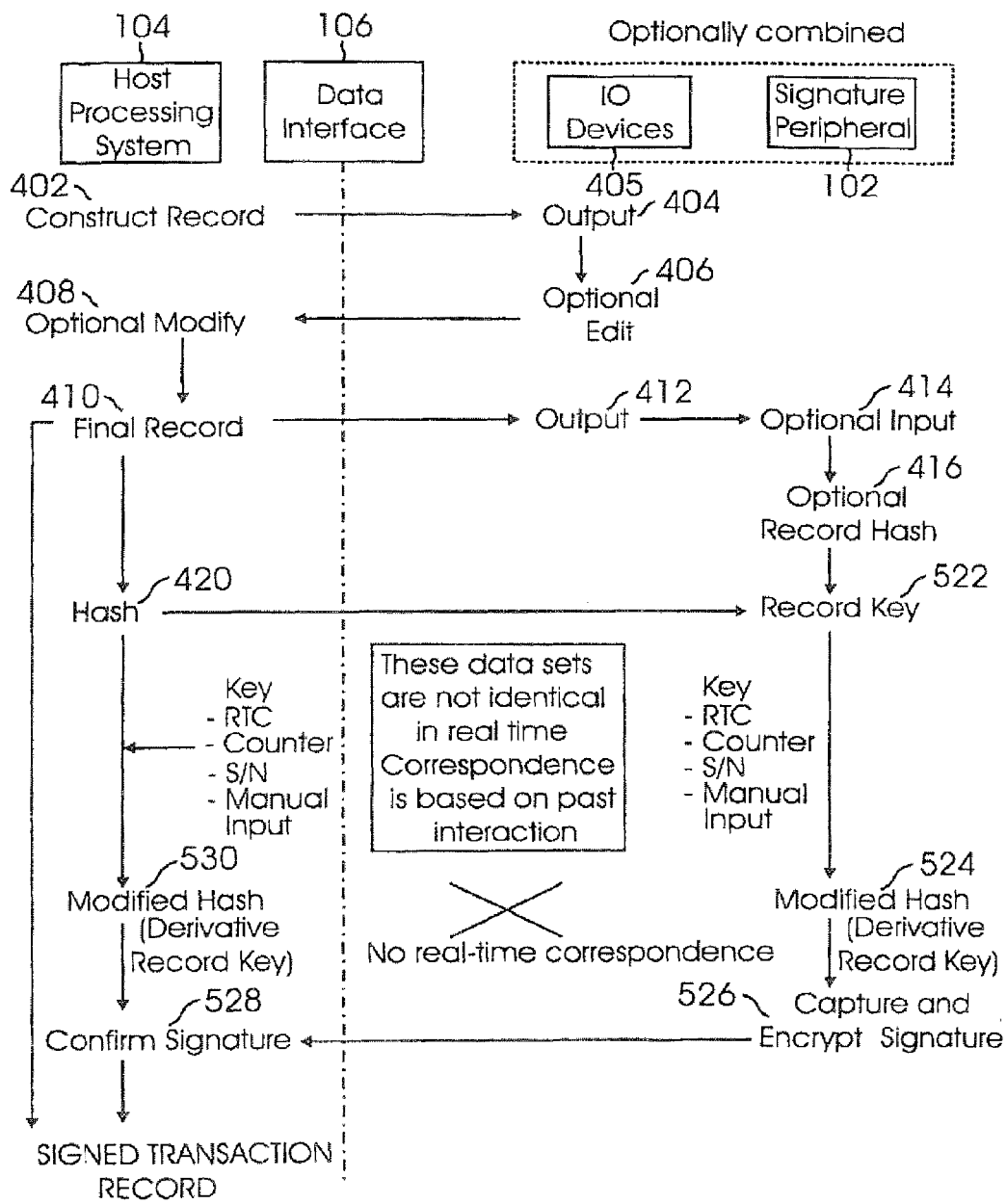
FIG. 5 is a flow diagram illustrating an electronic signature encryption method based on a derivative hashing scheme according to another embodiment of the invention.

FIG. 5 is a flow diagram illustrating an electronic signature encryption method based on a derivative hashing scheme according to another embodiment of the invention. The method illustrated in FIG. 5 is initially very similar to that illustrated in FIG. 4 but derivative hashing is added to provide additional security. Once a final transaction record is created 410, the transaction record is hashed, either at the host processing system 420 or the signature peripheral device 416, to create a Record Key 522. The signature peripheral device may include one or more registers with a real-time clock, peripheral device serial number, pseudo-random number generator, resettable counter, or other secret key that can be used to perform a secure derivative hash 524. According to one embodiment of the invention, at a periodic or random interval, e.g., ranging from days or weeks to minutes, or with each transaction, the host processing system 104 can access each signature peripheral device 102 and reset a clock or counter, while simultaneously resetting or setting a corresponding clock or counter in the software running on the host processing system to an arbitrary or pseudorandom value. A readable serial number in each signature peripheral device 102 may help facilitate the management of this process by using the peripheral serial number to identify the different signature peripheral devices 102 and/or as a seed or value for setting the clock, counter, or pseudorandom number generator.

Using one or more of the values provided by a clock, counter, serial number, pseudorandom number generator, the peripheral device 102 can generate a Derivative Record Key based on the hash of the transaction record and additional information from one or more of these values provided solely by the peripheral device 102. This Derivative Record Key may be created in various ways without departing from the invention. In one embodiment of the invention, a hash of the transaction record is created, the resulting Record Key is then combined with one or more of the values provided by a clock, counter, serial number, and/or pseudo-random number generator. Such combination may include appending these values, at the beginning, at the end, and/or somewhere in between the Record Key value. A combination may also include performing an operation using both the Record Key and the one or more values. The resulting Record Key and value(s) combination is then hashed to generate a Derivative Record Key that can be used to encrypt the signature at the peripheral device 102.

According to another embodiment of the invention, the transaction record and one or more of the values provided by the peripheral device clock, counter, serial number, pseudo-random number generator are combined. The resulting combination is then hashed to create a Derivative Record Key. Other ways of generating a Derivative Record Key based on the transaction record and additional information (e.g., counter values, clocks, etc.) that is provided solely by the peripheral device 102 (i.e., not transmitted to/from the host processing system 104) are encompassed within this invention.

A signature is then captured at the peripheral device 102, and bound, encrypted, or otherwise associated with the Derivative Record Key 524 (e.g., the Derivative Record Key may serve as a seed or key for an encryption algorithm). The encrypted signature is then sent to the host processing system 104 in, essentially, real-time for confirmation of the signature 528. Before confirming the signature, the received encrypted signature must be decrypted by the host processing system. The term "confirmation" is understood to mean that the data has arrived intact by means of ensuring proper decryption and identification of the data either simply to confirm that it has arrived intact, or to authenticate a signature whereby the received electronic signature is compared to data or a template suitable for that purpose. As previously noted, this process may be performed separately on points or segments of a signature rather than the signature as a whole. By implementing this method on the separately sampled signature points or segments, greater security may be achieved when transmitting the signature.

Because the additional information (e.g., counter values, clocks, etc.) used by the peripheral device 102 to generate the Derivate Record Key is not transmitted by the peripheral device 102, the host processing system 104 must create its own corresponding Derivate Record Key to decrypt the encrypted signature. Since the Derivative Record Key is generated using real-time values (e.g., counter values, clocks, etc.), the host processing system 104 must calculate its own Derivative Record Key at substantially the same time that the peripheral device 102 is generating its Derivative Record Key 530.

Since the host processing system 104 can set and/or reset the peripheral device's 102 clock, counter, pseudo-random number generator, etc., as well as its own corresponding internal clock, counter, pseudo-random number generator, etc., it can synchronize itself with the peripheral device as desired. Thus, when calculated at substantially the same time, the same Derivative Record Key value can be calculated by the peripheral device 102 and the host processing system 104. The host processing system 104 may randomly or periodically set, reset, or synchronize its internal clock, counter, and/or pseudorandom number generator with those of the peripheral device 102.

Another feature of the invention compensates for differences between the internal clock, counter, and/or pseudorandom number, etc., in the peripheral device 102 and the corresponding value(s) in the host processing system 104. According to one embodiment of the invention these values are not transmitted between the peripheral device and host processing system. Yet, in this embodiment of the invention, the host processing system 104 and peripheral device 102 must calculate the same Derivative Record Key so that the encrypted signature can be properly decrypted by the host processing system 104. Because these values (e.g., clock, counter, and/or pseudorandom number, etc.) change with time, it is important that the host processing system 104 calculate the Derivative Record Key at substantially the same time that it is calculated by the peripheral device 102, or otherwise compensate for this difference. In many circumstances however, these values (e.g., clock, counter, and/or pseudorandom number, etc.) will not be exactly the same in both the host processing system 104 and peripheral device 102. This may be due to transmission lags, processing clock skew or wandering, differences in processing speeds, etc.

Figure 6:
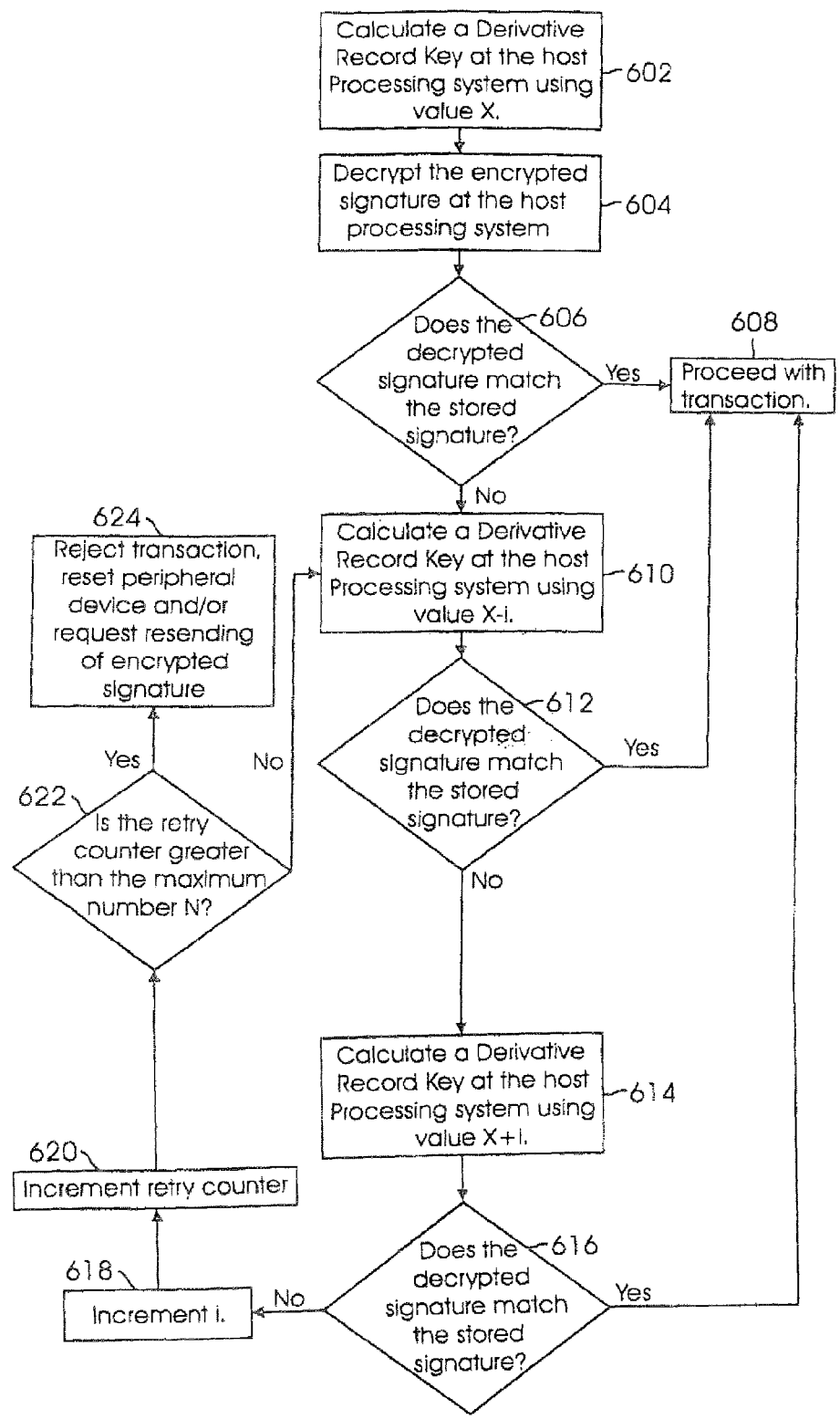
FIG. 6 is a flow diagram illustrating a method of searching for the correct derivative record key at a host processing system according to one embodiment of the invention.

FIG. 6 is a flow diagram illustrating a method of searching for the correct derivative record key at the host processing system according to one embodiment of the invention. First, the host processing system calculates a first Derivative Record Key 602 as describe in FIG. 5. It uses this first Derivative Record Key to decrypt the encrypted signature it receives from the peripheral device 604. It then compares the decrypted signature to a stored signature 606. If the signatures do not match, the host processing system may, optionally, check a known marker attached to the signature at the peripheral device to see if it can be recognized. If it can recognize this known marker, then it means that the correct derivative record key was calculated and the received signature is not valid. Otherwise, if the known marker is not recognized, then the host processing system can assume it did not use the correct derivative record key. Note that other methods of determining whether the correct derivative record key is being used can be employed without departing from the invention.

The host processing system then searches for the correct derivative record key. For example, if a clock value X is being used by the host processing system to generate the derivative record key, then the host processing system calculates a second Derivative Record Key using X−i instead 610. The second Derivative Record Key is then used to decrypt the encrypted signature 612. If the second Derivative Record Key fails to generate the correct signature, the host processing system then calculates a third Derivative Record Key using X+i instead 614 and repeats the confirmation process 616. This search is done until the signature is correctly decrypted or a maximum number N of searches has been done 622. A retry counter is incremented for each iteration 620 and the correction value i, which is used to search for the right clock number, is also incremented 618. If after N searches the host processing system fails to correctly decrypt the signature 624, then it may request that the peripheral device resend the encrypted signature or it may reset the clock, counters, pseudo-random number, etc., at the peripheral device locally and request the peripheral device to re-encrypt and send the signature.

By using the derivative record key scheme, the system can very effectively foil attempts to insert signatures into the data communication path or otherwise into the software running on the host processing system, and prevents the use of "stolen" signature data which may be intercepted between the peripheral device 102 to the host processing system 104.

If the signature transmission is delayed from the peripheral device 102 to the host processing system 104, real-time clock and date information from the host processing system 104 can be sent to the peripheral device 102, and the peripheral device 102 returns its own real-time clock and date information along with the encrypted signature so that the time skew experienced in transmission can be compensated for by the host processing system 104.

Similarly, any other "secrets" that are known in common by the host processing system 104 and the peripheral device 102, and are not frequently transmitted between the two, or are transmitted securely or provided securely by some alternate means such as through a smart card or other alternate transmission medium, can be added into the process of creating the derivative hash that is used to create the Derivative Record Key. In other words, the use of a "secret" key can be used to enhance the integrity and security of the transaction record-based hash encryption where the Record Key that corresponds to each transaction record essentially changes with every transaction.

Another feature of the invention provides a method of using a real-time clock to identify a signature-capturing peripheral device and improve data transmission integrity and security. For simplicity, it will be described from the perspective of the host processing system being the controlling entity. However, this method can be initiated and/or controlled either by the peripheral device, the host processing system, or a third-party controlling entity.

Figure 7:
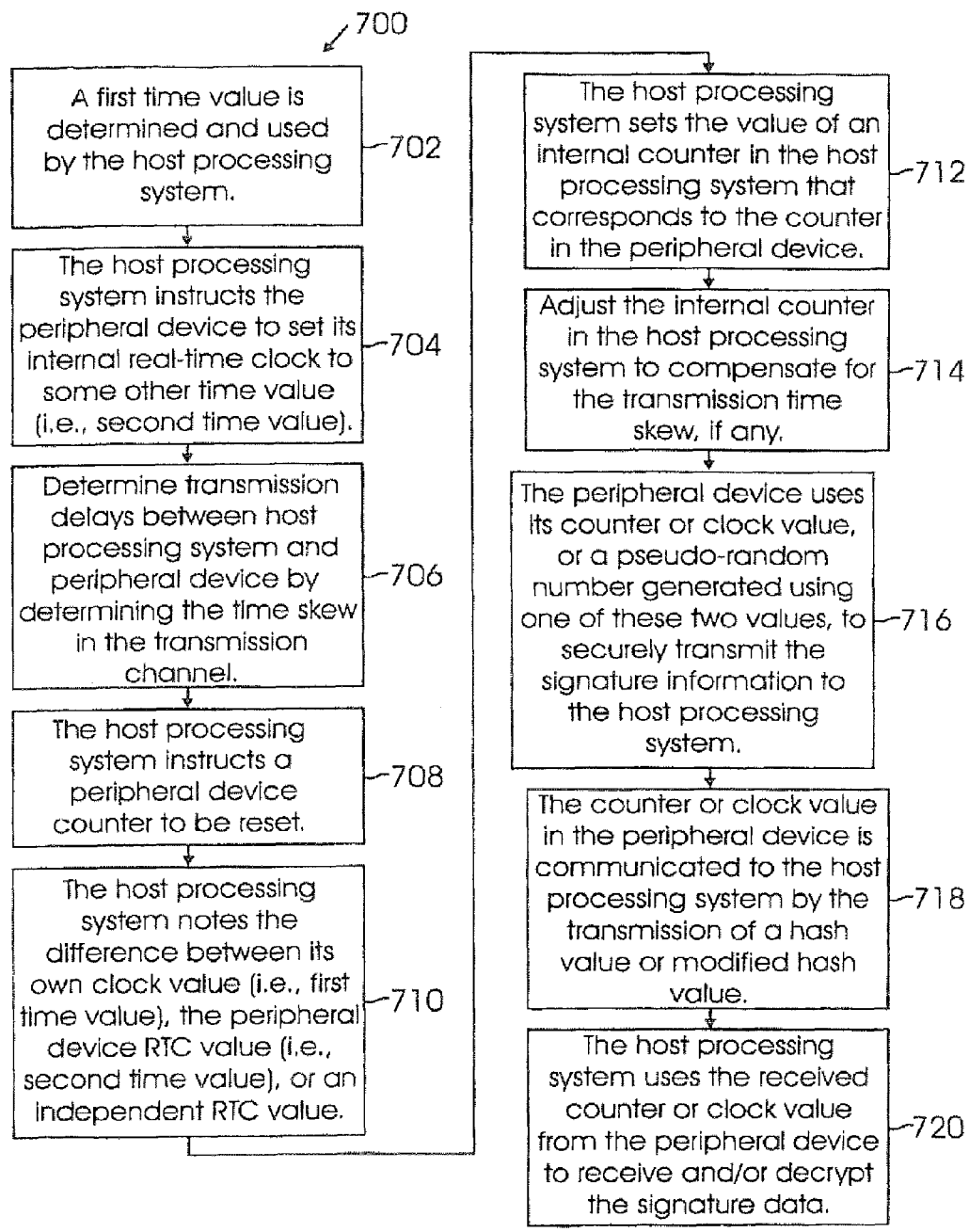
FIG. 7 is a flow diagram illustrating a method of using different clock values at a host processing system and a peripheral device to securely handle the transmission and decryption of a signature sent from the peripheral device to the host processing system according to one embodiment of the invention.

FIG. 7 is a flow diagram illustrating a method of using different clock values at the host processing system and peripheral device to securely handle the transmission and decryption of a signature sent from the peripheral device to the host processing system according to one embodiment of the invention. A first time value is determined and used by the host processing system 702. The host processing system instructs the peripheral device to set its internal real-time clock (RTC) to some other time value (i.e., second time value) 704. If there are significant delays in the data transmission channel, the peripheral device can return to the host processing system an indication that the time and date has been set. Using this indication, the host processing system can then determine the nominal communication delay between to/from the peripheral device 706. This time skew can be determined on a one-way or two-way basis and this time skew information can be used, if needed, later in this process.

Within the peripheral device the real-time clock (RTC) controls the state of a counter. The counter can be reset by an instruction from the host processing system, and both the counter and the RTC are always operating, using a battery-backup if necessary. At a time determined by the host processing system, the host processing system instructs the peripheral device counter to be reset 708. At the same time, the host processing system sets a value determining the correspondence between its own clock value (i.e., first time value), the peripheral device RTC value (i.e., second time value), or an independent RTC value 710. The host processing system also sets the value of an internal counter in the host processing system that corresponds to the counter in the peripheral device 712. If desired, the communication skew can be taken into account in this correspondence by adjusting the value of the host processing system according to the time skew 714. The value of the host processing system counter and its correspondence to real-time is kept secret. For example, the host processing system may send a reset command to the peripheral device counter at 12:00:00 GMT, resetting the counter in the peripheral to zero (0) or some other value which can be predetermined, random, or based on some other cryptographic data, data relating to the peripheral device (e.g., its serial number, or a hash of its serial number), or some other data. At the same time, the host processing system records its real-time value (i.e., first time value) in its own secure way, and optionally a number corresponding directly or in some obscure way, to the event.

At a later time when a transaction occurs between the peripheral device and the host processing system, only the host processing system and the peripheral device will know the correspondence between the counter or clock values in each unit. The peripheral device uses its counter or clock value, or a pseudo-random number generated using one of these two values, to securely transmit the signature data 716. For example, in one embodiment of the invention, the peripheral device uses the counter or clock value, or the pseudo-random number, as a stamp (e.g., time stamp, value stamp, etc.) in transmitting one or more data packets or segments to the host processing system. In another embodiment of the invention, the peripheral device uses the counter or clock value, or the pseudo-random number, to encode or encrypt the captured signature before transmission to the host processing system. In one implementation of the invention, these counters or clock values, or pseudo-random numbers may be employed in separately encrypting different sample points or segments of a signature.

Assuming that the data communications line may be compromised for a brief period of time, or that the communication is taking place over a different data communication path that may have been compromised, this "shared secret" between the two ends of the communication link can be used to improve the authenticity of the transaction. The counter or clock value in the peripheral device is communicated to the host processing system by the transmission of a hash value or modified hash value to the host processing system representing only the contents of the peripheral device counter or clock 718. The host processing system uses the received counter or clock value from the peripheral device to receive and/or decrypt the signature data 720.

Another feature of the invention provides a method for confirming a signature by comparing hashed values instead of the actual signature data. Additional security may be obtained by minimizing the use of the original or captured signature, the reference signature data, and/or any real-time signature information.

Figure 8:
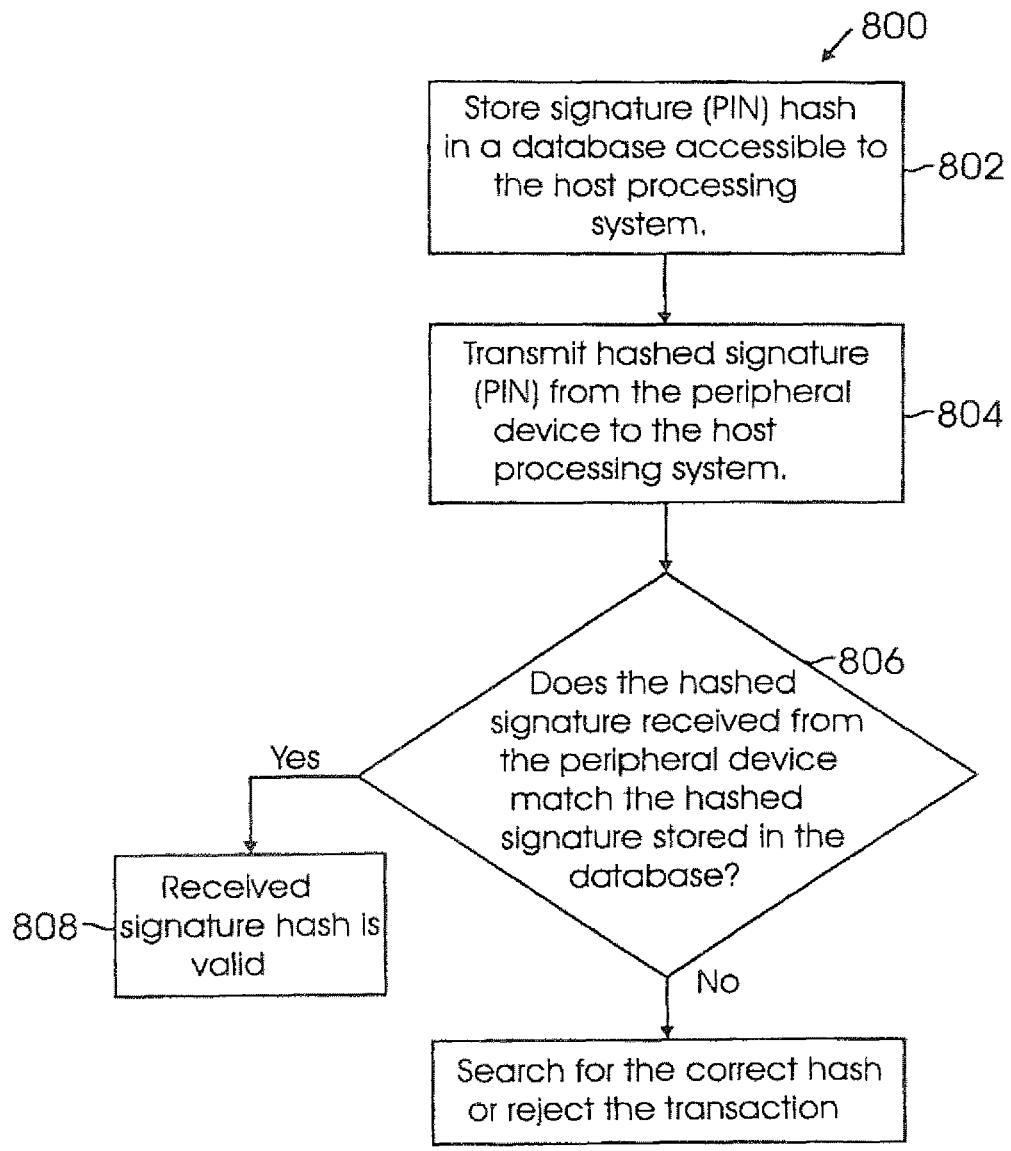
FIG. 8 is a flow diagram illustrating another method of maintaining the security of signature information between a peripheral device and a host processing system according to one embodiment of the invention.

FIG. 8 is a flow diagram illustrating another method of maintaining the security of signature information between a peripheral device and a host processing system according to one embodiment of the invention. Consider the situation where the captured signature is a PIN number, for example. The hash of the PIN is stored in a database, accessible to the host processing system, instead of the actual PIN number 802. The data transmitted from the peripheral device to the host processing system is the hash of the PIN number or a derivative hash of the PIN number 804. Thus the PIN never exists as a separate record. At the host processing system, if the hash of the PIN received from the peripheral device matches the stored hash of the PIN in the database 806, then the PIN entered is considered to be valid 808. However, with this method, no one has access to the actual PIN number. This prevents anyone from intercepting the PIN and using it at the operator interface of a peripheral device to perpetrate a fraud.

Where the data representing the signature is fixed or repeatable, as in a PIN number, the comparison of hashes is relatively straightforward. However, where the signature represents biometric data or other data may vary slightly each time (such as handwriting), the biometric data can be broken down into repeatable, or near-repeatable components through analysis or other means. Then these repeatable elements can be hashed separately, or in a group to form a repeatable hash, and allowing comparison. If there is a little variation in the analyzed elements to the signature data, the comparison at the host processing system can implement a search process whereby analytical elements of the signature where some small variation is allowed or expected can be tested through the corresponding hash algorithm at the processor to determine a possible match to the electronic signature of record.

Another feature of the invention provides a way to check for transmission losses of electronic signature data. Oftentimes, information may be broken into multiple packets or data segments for transmission. Due to various communication problems, sometimes one or more the transmitted packets or segments may not be received. In some applications, it may be useful to know that all of the data associated with an electronic signature, as captured by a peripheral device, has been received by the host processing system. In order to achieve this, the following novel technique may be employed, either stand-alone or in conjunction with the other techniques herein disclosed.

Figure 9:
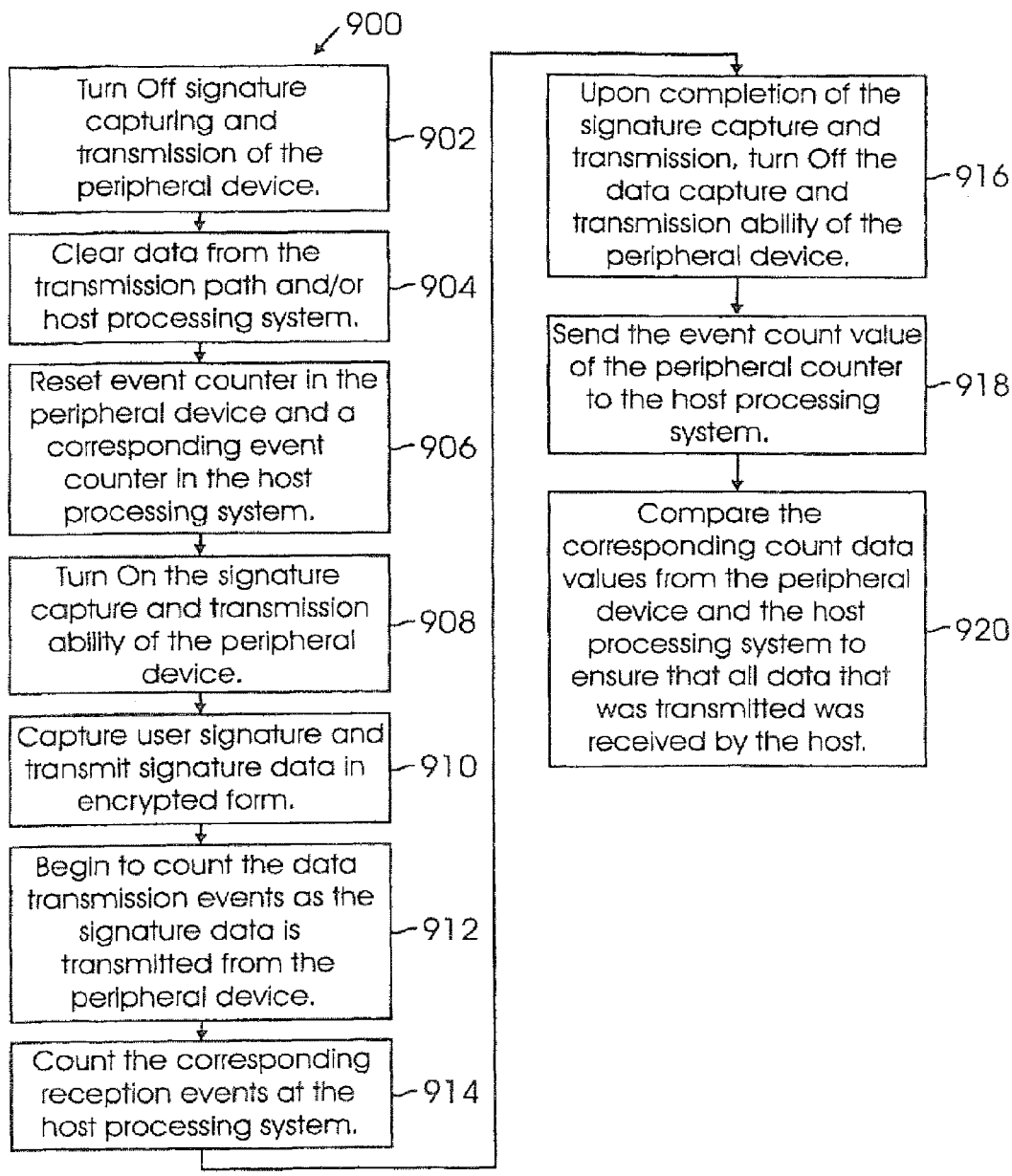
FIG. 9 is a flow diagram illustrating a method of determining whether electronic signature data sent by a peripheral device has been completely received by a host processing system according to one embodiment of the invention.

FIG. 9 is a flow diagram illustrating a method of determining whether electronic signature data sent by a peripheral device has been completely received by a host processing system according to one embodiment of the invention. The signature capturing and transmission ability of the peripheral device is turned Off 902. Any data that may be buffered in the data transmission path and/or host processing system is then reset or cleared 904. Reset an event counter in the peripheral device and a corresponding event counter at the host processing system 906, which is used to count data packets, or bytes sent by the peripheral via the transmission medium to the host processing system.

Turn On the signature capture and transmission ability of the peripheral device 908 so that a signature can be captured and signature data (in encrypted form) can be transmitted 910. As the signature data is transmitted, begin to count data transmission events in the peripheral device 912 and the corresponding reception events at the host processing system 914.

Upon completion of the signature capture and transmission, turn Off the data capture and transmission ability of the peripheral device 916, send the event count value of the peripheral counter to the host processing system 918 either as a hash value, in the clear, encrypted, or otherwise encoded, including perhaps pseudorandom encoded. Compare the corresponding count data values from the peripheral device and the host processing system to ensure that all data that was transmitted was received by the host 920.

Some communication schemes transmit timestamps along with data packets or segments to synchronize reception of transmitted data at the receiving system. However, this may expose time information (e.g., the transmitting system's clock) that may be used to compromise the security of the data packets or segments being transmitted.

Figure 10:
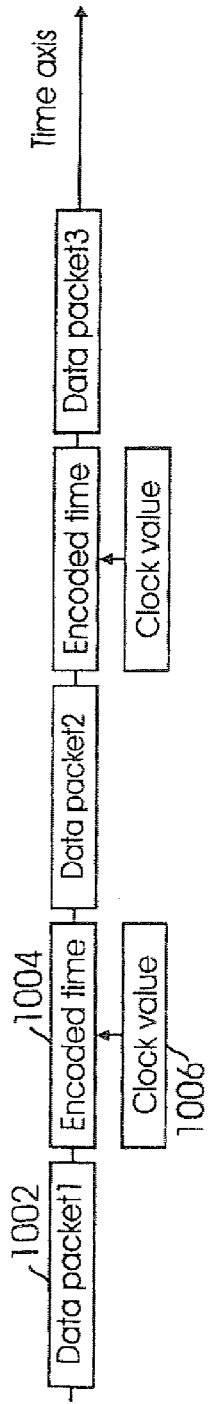
FIG. 10 is a block diagram illustrating a signature data transmission stream from a peripheral device to a host processing system with secured timestamps according to one embodiment of the invention.
Figure 11:
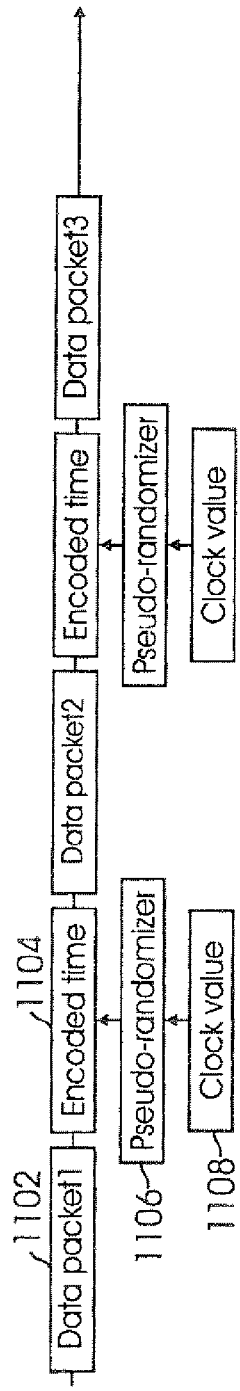
FIG. 11 is a block diagram illustrating a signature data transmission stream from a peripheral device to a host processing system with secured timestamps according to another embodiment of the invention.
Figure 12:
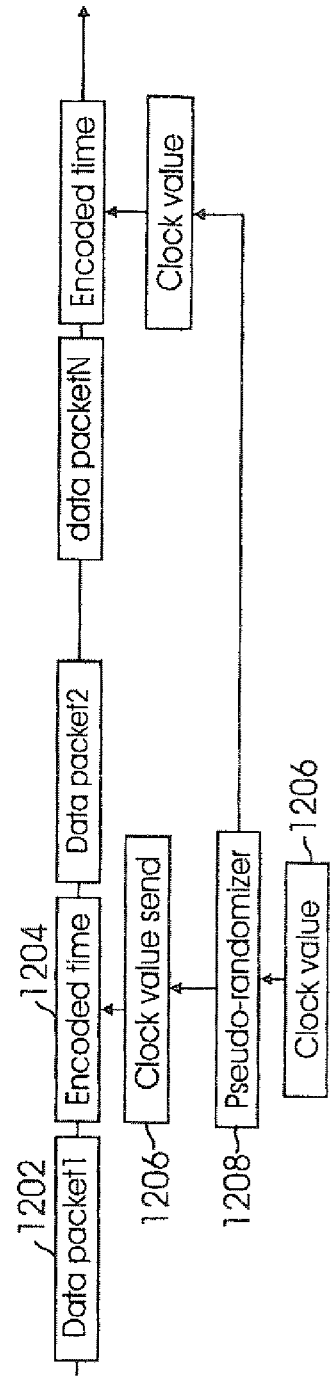
FIG. 12 is a block diagram illustrating a signature data transmission stream from a peripheral device to a host processing system where the timestamps are randomly inserted into the signature data transmission stream according to another embodiment of the invention.

One embodiment of the invention provides an encoded certification stamp in a signature peripheral device to secure the captured signature prior to transmission. FIGS. 10, 11, and 12 are block diagrams illustrating encoding methods that may be used to secure a signature at a signature peripheral device according to various embodiments of the invention.

FIG. 10 is a block diagram illustrating a signature data transmission stream 1002 from a peripheral device to a host processing system with secured timestamps 1004 according to one embodiment of the invention. Certification timestamps 1004 are encoded and can simply be the data from the time clock circuit 1006, provided in absolute, relative, or incremental time. Note that the time clock circuit 1006, as well as all other clocks in FIGS. 11-14, can be clocks internal to a signature-capturing interface/device or part of a peripheral device. Thus, the techniques described herein can be implemented between the signature-capturing interface/device and a peripheral device or between a peripheral device and another device. These timestamps can be provided with the transmission of every data packet where the data does not come from a signature device that samples the raw signature data as a regular, periodic, or certified time interval. This timestamp data may be transmitted less frequently however, for the purpose of verifying the use of a regular, periodic, or certified sampling interval within the signature-capturing device. In this latter case, the system achieves greater accuracy with less data because once determined, the knowledge of the exact regular, period sampling interval in determining the signature data sampling interval is more accurate, contains no sampling quantization error, and consumes much less bandwidth and storage space than a system which transmits and stores the signature data along with the individual timestamp values associated with each data point or packet. To determine or certify the regular sampling interval used by a pen and tablet signature capture circuit, for example, timestamps need only be sent every ten (10) or one hundred (100) points, together with the number of data points between timestamp transmissions. The number of timestamp transmissions included between timestamp values can be hashed, encoded, encrypted, pseudo-random, or otherwise obscured from an unauthorized recipient using the techniques described herein to conceal the true value. In addition, the timestamp values can be provided on natural boundaries of the electronic signature capture system. In the case of the pen and tablet, for example, the timestamps can be sent at the beginning and end of a signature stroke. With a PIN-entry, the timestamps can be provided at the start and release of a PIN key, for example. By combining knowledge of the intended regular, periodic, or certified clock interval of the signature-capture or conversion circuit, the host processing device is able, after decoding the information, to simply divide the number of received data points by the reported time interval to determine the signature circuit sampling rate. The certification stamps 1004 can also provide information stored in the signature-capturing peripheral device, such model number and/or serial number. By knowing the correlation between the model and serial number of the peripheral device and the certified clock frequency used within the peripheral device, the host processing system can compare the time interval provided by the time data inherent in the certification stamps 1004 for each data packet 1002 with the characteristics expected for each data packet 1002 based on its certified time interval. However, simply sending time and/or date information or an incremental counter value with each data packet 1002 has its drawbacks, mainly security. For example, if the signature data were intercepted by someone other than its intended user, encrypted or not, the unauthorized user could use the encoded real-time information 1004 to easily determine the precise spacing between data packet 1002 intervals and thus re-construct a very accurate false signature for use in transactions that are not authorized for use with the signature. Not only does the use of a real-time stamp sent with each data point allow the data to be re-constructed in real-time, this stamp inherently sends information about the order in which the samples belong along the signature path.

FIG. 11 is a block diagram illustrating a signature data transmission stream 1102 from a peripheral device to a host processing system with secured timestamps 1104 according to another embodiment of the invention. In this embodiment of the invention, the encoded certification stamp 1104 sent with the signature coordinate data can include pseudorandom data. A pseudo-random number generator 1106 can be used to provide random number based on the clock value 1108.

FIG. 12 is a block diagram illustrating a signature data transmission stream from a peripheral device to a host processing system where the timestamps 1104 are randomly inserted into the signature data transmission stream according to another embodiment of the invention. A pseudo-random number generator 1208 is used randomly insert encrypted timing information 1204 along the data packet stream 1202. A pseudo-random number generator 1208 may utilize the clock value 1206 as a seed.

Figure 13:
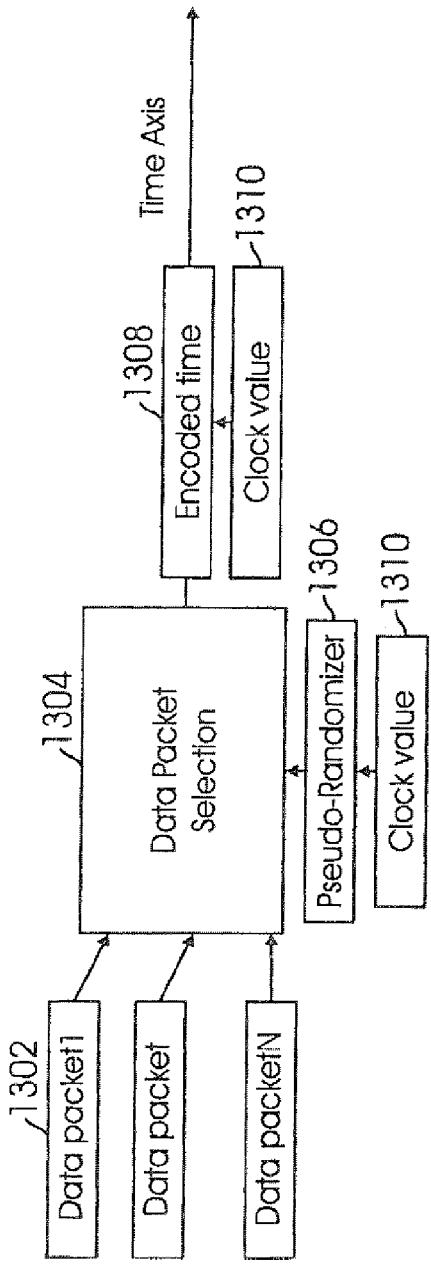
FIGS. 13 and 14 are block diagrams illustrating how signature data packets transmitted between a peripheral device and a host processing system may be scrambled to secure the signature information according to various embodiments of the invention.
Figure 14:
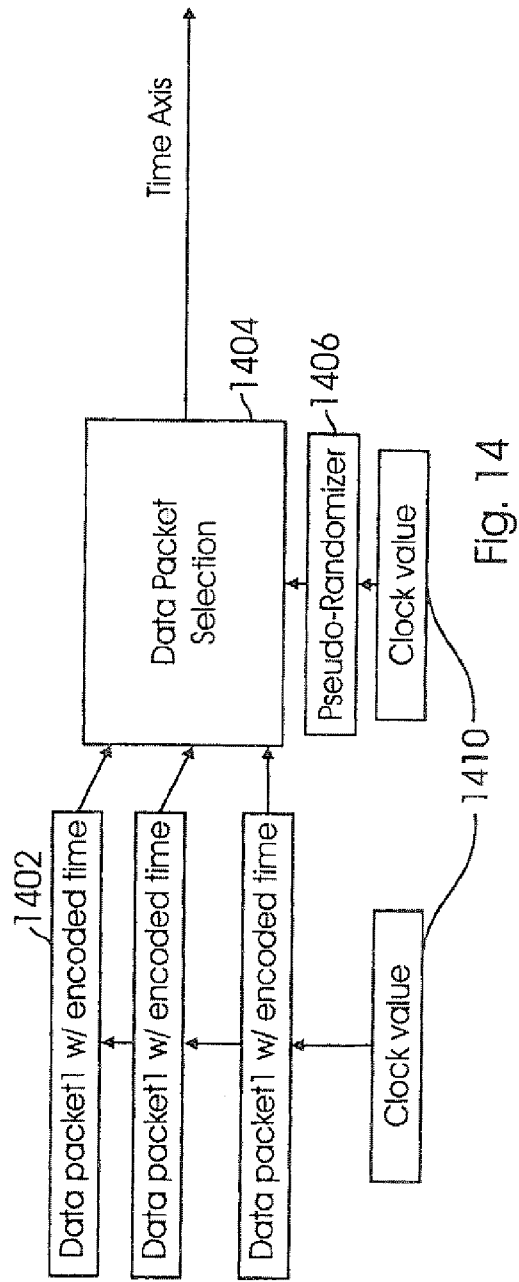

Instead of providing the exact, linear timing information about signature data packets in an expected, orderly manner, the timing information can be provided in a seemingly random manner, and the sequence of data packets transmissions can be scrambled. FIGS. 13 and 14 are block diagrams illustrating how such data packet scrambling may be accomplished according to various embodiments of the invention.

FIG. 13 illustrates how signature data packets are randomly transmitted by a peripheral device so that, even if the encoded time is known, the signature cannot be reconstructed. The data packets 1302 are buffered at the peripheral device. A pseudo-random number generator 1306 uses the internal clock 1310 to generate random numbers that cause the data packet selector 1304 to randomly select from the buffered data packets 1302. The data packets 1302 are thus transmitted out of order with an encoded timestamp 1308 between data packets.

With the software on the host processing system knowing the pseudo-random code 1306 used by the peripheral device, it can re-construct the exact timing and sequence of the data packets 1302. This technique presents a formidable challenge to the hacker because while there is no tell-tale data encoded into the data stream from the peripheral device, and there is no apparent order to the data, the host processing system which knows the pseudo-random generation algorithm can reconstruct the signature data and verify the timing interval precisely.

To further strengthen the technique illustrated in FIG. 13, FIG. 14 illustrates how the encoded time is first appended as part of the data packets 1402. The data packet selector 1404 then uses a pseudo-random number generator 1406, working from a peripheral clock or counter 1410, to randomly transmit the data packets 1402 in a random sequence.

The encoded certification stamps discussed in FIGS. 10-14 can simply be the model and serial number of the peripheral device. For security purposes, this stamp information can be an encryption or hash of the model and serial number together with the real-time clock or counter value, the transaction record hash, or other such data.

Alternatively, the software on the host processing system can compare information known about the peripheral device model and serial number, such as the name or company of the peripheral device owner as kept in a database.

In various other embodiments of the invention, a combination of techniques illustrated in FIGS. 10-14 can be used together. Additionally, these techniques can be used together with the security techniques previously disclosed. This general system can also be used to transmit and receive certification of data from other types of electronic signature input devices. In most all of these systems, the timing and ordered sequence of the data is important to its accurate re-construction. For example, the timing of PIN data entry can be stamped for example as a biometric measure. The sample rate and order of voice data is critical to its accurate reconstruction and authentication, and so on.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A method comprising:
   a) receiving transaction data at a first device;
   b) capturing a user's signature as a plurality of data points at the first device;
   c) dividing, by the first device, the captured signature into a plurality of signature segments, each signature segment including a subset of the plurality of data points;
   d) deriving, by the first device, a unique key for each signature segment by creating a hash of the transaction data and combining the hash with data associated with the first device and storing the hash in a memory connected to a second device;
   e) encrypting, by the first device, each signature segment using the unique key for that segment;
   f) transmitting the plurality of signature segments from the first device to the second device;
   g) keeping, by the second device, a first count of the plurality of signature segments transmitted from the first device, keeping a second count of a number of signature segments received by the second device,
   h) comparing, by the second device, the first count to the second count to determine if all signature segments have been received;
   i) recreating, by the second device, the unique keys using the hash stored in the memory and the data associated with the first device;
   j) decrypting, by the second device, each signature segment using its unique key;
   k) combining, by the second device, the decrypted signature segments to reassemble the captured signature;
   l) comparing, by the second device, the captured signature to a signature stored in the second device, and
   m) verifying, by the second device, the captured signature that the captured signature matches the signature stored in the second device.

2. The method of claim 1 wherein the transaction data includes price information for a transaction.

3. The method of claim 1 wherein the transaction data includes identification of goods being transacted.

4. The method of claim 1 further comprising the step of sending the unique key for each segment between the first device to the second device at irregular intervals.

5. The method of claim 1 wherein transmitting the plurality of signature segments from the first device to the second device comprises transmitting the plurality of signature segments in a pseudo-random order.

6. The method of claim 1 wherein the signature is captured as separate sample points.

7. The method of claim 6, where the sample points are based on at least one of displacement, pressure, or time information of the signature.

8. The method of claim 1 wherein the signature is encrypted as separate sample points, each sample point being encrypted with a different encryption key.

9. The method of claim 1 wherein the signature is stored as separate encrypted sample points.

* * * * *